United States Patent
Yadav et al.

(10) Patent No.: US 12,282,454 B2
(45) Date of Patent: Apr. 22, 2025

(54) SYSTEM AND METHOD FOR DATA PROTECTION USING MACHINE LEARNING

(71) Applicant: Dell Products L.P., Round Rock, TX (US)

(72) Inventors: Sunil Yadav, Punjab (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/157,467

(22) Filed: Jan. 20, 2023

(65) Prior Publication Data

US 2024/0248875 A1   Jul. 25, 2024

(51) Int. Cl.
*G06F 16/00*   (2019.01)
*G06F 11/14*   (2006.01)
*G06F 16/11*   (2019.01)

(52) U.S. Cl.
CPC ........ *G06F 16/125* (2019.01); *G06F 11/1451* (2013.01)

(58) Field of Classification Search
CPC ............................ G06F 16/125; G06F 11/1451
USPC .................................................. 707/600–899
See application file for complete search history.

(56) References Cited

U.S. PATENT DOCUMENTS

| | | | |
|---|---|---|---|
| 7,415,585 B1 | 8/2008 | Rossi | |
| 7,873,601 B1 | 1/2011 | Kushwah | |
| 8,200,637 B1 | 6/2012 | Stringham | |
| 8,214,406 B2 | 7/2012 | Kushwah | |
| 8,244,681 B2 | 8/2012 | Laffin | |
| 8,412,680 B1 | 4/2013 | Gokhale | |
| 9,158,632 B1 | 10/2015 | Xing | |
| 9,411,821 B1 | 8/2016 | Patwardhan et al. | |
| 9,747,169 B2 | 8/2017 | Kottomtharayil et al. | |
| 9,934,104 B2 | 4/2018 | Kushwah et al. | |
| 10,338,823 B2 | 7/2019 | Kottomtharayil et al. | |
| 10,606,709 B1 * | 3/2020 | Bansal | G06F 11/1464 |
| 10,769,103 B1 | 9/2020 | Patwardhan et al. | |
| 10,838,821 B2 | 11/2020 | Bhagi et al. | |
| 10,872,069 B2 | 12/2020 | Dornemann et al. | |
| 11,144,402 B2 | 10/2021 | Ahn | |
| 11,467,914 B2 | 10/2022 | Bhagi et al. | |
| 12,093,578 B2 | 9/2024 | Singhal | |
| 2011/0107043 A1 | 5/2011 | Palagummi | |
| 2011/0125714 A1 | 5/2011 | Manson | |

(Continued)

FOREIGN PATENT DOCUMENTS

EP   3796174 B1   10/2022

*Primary Examiner* — Michelle N Owyang
(74) *Attorney, Agent, or Firm* — Chamberlain, Hrdlicka, White, Williams & Aughtry; Aly Z. Dossa (57) ABSTRACT

A method for information recovery includes providing a set of rules to hosts, where each host performs a backup operation using the set of rules by sending at least one file to at least one backup location. The method also includes receiving, from each host, a first metadata corresponding to files backed up in the backup operation, where the metadata from each host forms a set of metadata, providing the set of metadata to a learning module, receiving from the learning module metadata analysis, adjusting, using the metadata analysis, the set of rules to obtain an adjusted set of rules, and providing the adjusted set of rules to the plurality of hosts, where at least one host of the hosts uses the adjusted set of rules to identify a backup location for a file.

17 Claims, 6 Drawing Sheets

(56) References Cited

U.S. PATENT DOCUMENTS

| | | |
|---|---|---|
| 2011/0167221 A1 | 7/2011 | Pangal |
| 2012/0084261 A1 | 4/2012 | Parab |
| 2013/0339298 A1 | 12/2013 | Muller et al. |
| 2014/0181441 A1 | 6/2014 | Kottomtharayil et al. |
| 2014/0181442 A1 | 6/2014 | Kottomtharayil et al. |
| 2014/0181443 A1 | 6/2014 | Kottomtharayil et al. |
| 2016/0259694 A1 | 9/2016 | Huang et al. |
| 2018/0018236 A1 | 1/2018 | Kottomtharayil et al. |
| 2018/0173874 A1 | 6/2018 | Muttik |
| 2018/0196606 A1* | 7/2018 | Chen ................... G06F 11/2097 |
| 2018/0225177 A1 | 8/2018 | Bhagi et al. |
| 2019/0034453 A1* | 1/2019 | Jarvis .................... G06F 16/113 |
| 2019/0332410 A1* | 10/2019 | Chopra ............... G06F 11/1464 |
| 2020/0192578 A1 | 6/2020 | Sinha |
| 2020/0233845 A1 | 7/2020 | Dornemann et al. |
| 2021/0026739 A1 | 1/2021 | Bhagi et al. |
| 2021/0049074 A1* | 2/2021 | Bezerra Maimoni ....................... G06F 11/1461 |
| 2021/0133040 A1 | 5/2021 | Bansal et al. |
| 2021/0133046 A1* | 5/2021 | Yadav ................. G06F 16/2358 |
| 2021/0208788 A1 | 7/2021 | Kottomtharayil et al. |
| 2021/0240573 A1 | 8/2021 | Upadhyay et al. |
| 2021/0248044 A1 | 8/2021 | Perneti et al. |
| 2021/0303405 A1 | 9/2021 | Slater |
| 2021/0303409 A1* | 9/2021 | Seshadri ............. G06F 11/1464 |
| 2022/0229739 A1 | 7/2022 | Nara |
| 2022/0334925 A1 | 10/2022 | Rakesh et al. |
| 2022/0413967 A1 | 12/2022 | Bhagi et al. |

* cited by examiner

SYSTEM AND METHOD FOR DATA PROTECTION USING MACHINE LEARNING

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for metadata-based data protection in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, backup operations write all files into a single backup container. Thereafter, the entire container is treated as a single file, causing additional operations such as replication and tiering to be performed on the entire container. Further, the use of the single container introduces interdependencies between the files within the single container. As such, backing up all of the files into a single container can cause inefficiencies post-backup.

Further, workloads generate increasingly smaller files with each file having different properties. For example, some files may be never changing while others may be frequently changing. Some files are never restored while others a frequently restored. Embodiments of the invention relate to methods and systems to utilize metadata-based backup (MBB) mechanisms to provide hybrid protection policies for data protection. More specifically, various embodiments of the invention utilize metadata corresponding to files to generate a set of rules that specify which storage location that files should be sent to based on the metadata associated with the file. In this manner, the files from one host can be backed up to multiple, different storage locations based on the metadata corresponding to the files. Further, the backing up to multiple, different storage locations may be done concurrently. As a result, one or more embodiments disclosed herein advantageously provide faster backups while also avoiding dependencies between files.

The following describes various embodiments of the invention.

Figure 1:
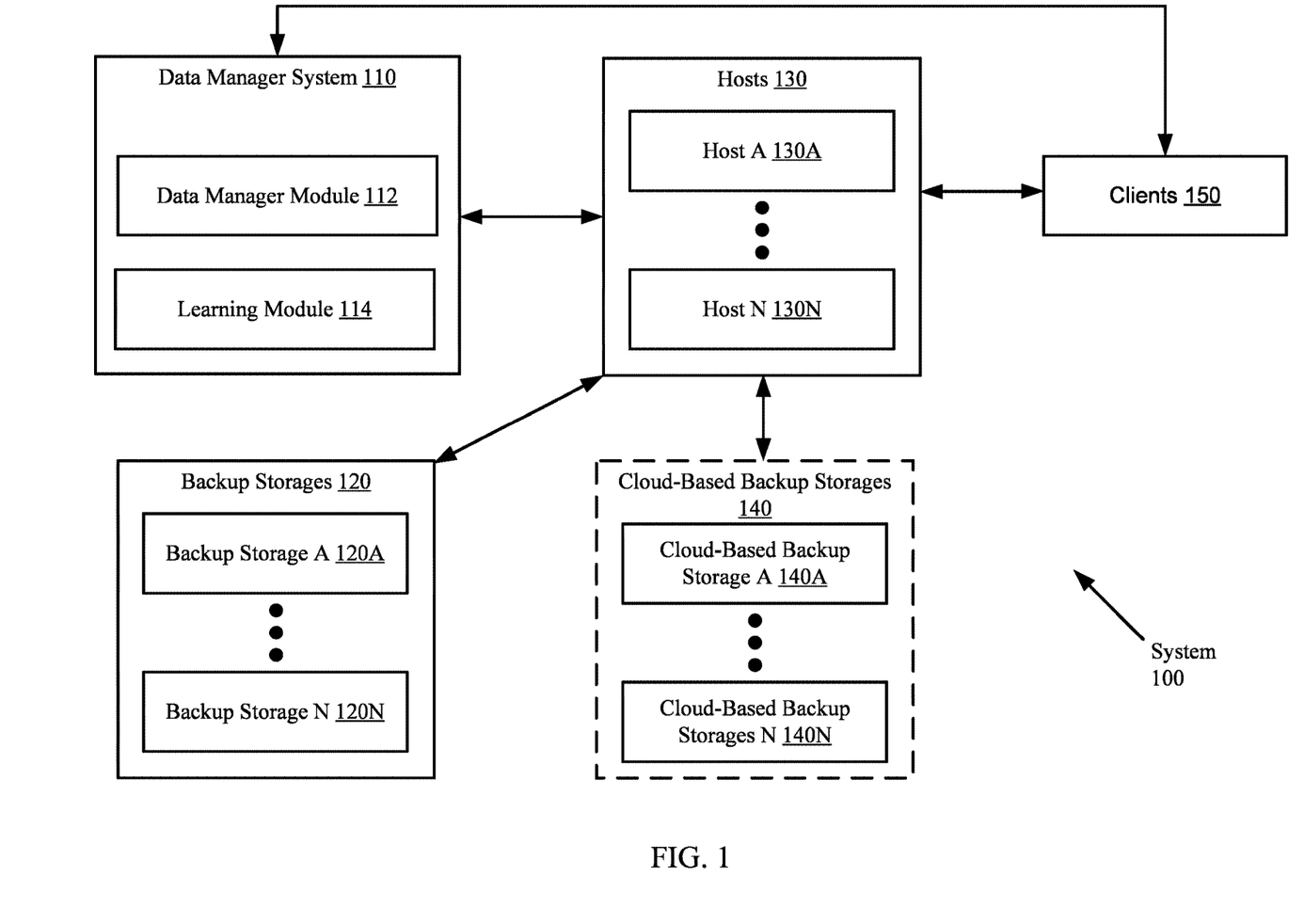
FIG. 1 shows a diagram of a system in accordance with one or more embodiments of the invention.

FIG. 1 shows a diagram of a system (100) in accordance with one or more embodiments of the invention. The system (100) includes a data Manager system (110), backup storages (120), hosts (130), cloud-based backup storages (140), and clients (150). The system (100) may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the data manager system (110) may include a data manager module (112) and a learning module (114). The data manager module (112) and the learning module (114) may be physical or logical devices, as discussed below.

In one or more embodiments of the invention, the data manager module (112) may provide backup services to the hosts (130). The backup services may include generation and storage of backups (e.g., MBBs) in the backup storages (120) and/or cloud-based backup storages (140).

More specifically, the data manager module (112) may provide backup services to the hosts (130) by orchestrating: (i) generation of backups of the hosts (130), (ii) storage of the generated backups of the production hosts (130) in the backup storages (120) and/or cloud-based backup storages (140), (iii) consolidation of backup requests to reduce or prevent generation of backups that are not useful for restoration purposes, and (iv) restoration of the production hosts (130) to previous states using backups stored in the backup storages (120) and/or cloud-based backup storages (140).

Additionally, to provide the aforementioned backup services, the data manager module (112) may include functionality to generate and issue instructions to any component of the system (100) of FIG. 1. In one or more embodiments, the data manager module (112) may also generate instructions in response to backup requests from other entities.

In one or more embodiments of the invention, the data manager module (112) may generate such instructions in accordance with backup schedules that specify when backups are to be generated. In one or more embodiments, a backup schedule may lay out specific points in time for a backup process to be performed. Additionally, these backup schedules may be configured based on a user's recovery point objective (RPO).

More specifically, in one or more embodiments of the invention, the time between a data loss event and a most recent backup may be referred to herein as the "user's RPO." For example, if a user has a 4-hour RPO for an application (e.g., software), then the maximum gap between the data loss event and the most recent backup will be 4-hours. In some scenarios, having a 4-hour RPO may not necessarily mean the user will lose 4 hours' worth of data. For example, a word processing application may go down at 12:35 a.m. and may be restored by 1:10 a.m. In this case, the user may not have much data to lose.

In another example, a security application may go down at 10:05 a.m. and may not be restored until 1:25 p.m. In this case, the user may lose data that is highly valuable to the user. For this reason, the user may set an RPO based on the application priority and may configure the backup schedules accordingly.

The aforementioned examples are not intended to limit the scope of the invention.

In one or more embodiments of the invention, the MBB may be used by the data manager module (112) to read metadata from a volume in a file system that stores data of the hosts (130). In one or more embodiments, the file system may divide the volume into a number of files. The MBB mechanism may then back up the files in the file system to the backup storages (120) and/or cloud-based backup storages (140).

In one or more embodiments of the invention, the file system may be a method in which an operating system (OS) uses to control how data is named, stored, and retrieved. For example, once a user has logged into a computing device (e.g., 400, FIG. 4), the OS of that computing device uses the file system of that computing device to retrieve one or more applications to start performing one or more operations (e.g., functions, tasks, activities, etc.).

Figure 4:
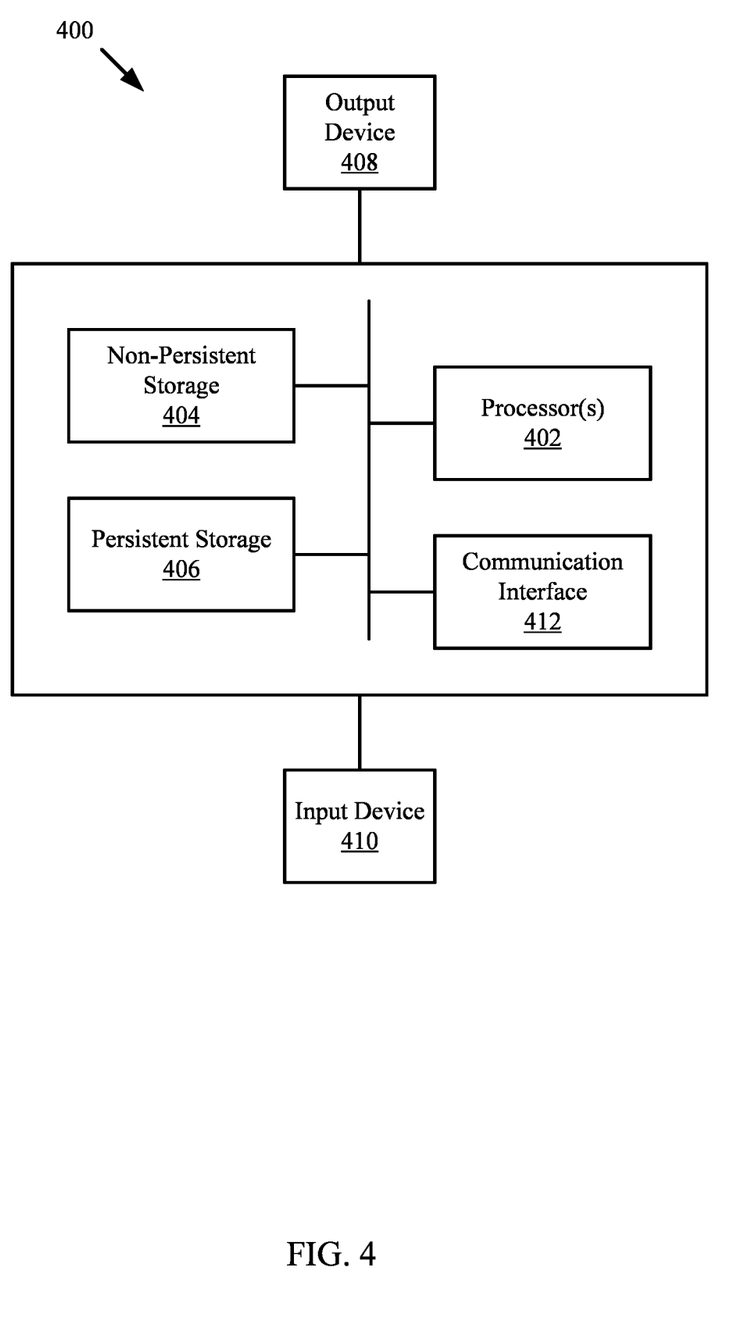
FIG. 4 shows a diagram of a computing device in accordance with one or more embodiments of the invention.

In one or more embodiments of the invention, the data manager module (112) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device, cause the computing device to perform the functionality of the data manager module (112) described throughout this application.

Alternatively, in one or more embodiments of the invention, the data manager module (112) may be implemented as a logical device. The logical device may utilize the computing resources of any number of computing devices to provide the functionality of the data manager module (112) described throughout this application.

In one or more embodiments, the learning module (114) is any hardware (e.g., circuitry), software, firmware, or any combination thereof that includes functionality to train and/or validate a machine learning ("ML") model using metadata corresponding to files to generate a set of rules, as discussed below. In one or more embodiments, metadata corresponding to files are used as input variables, and along with known results (e.g., target backup locations), are used to train and validate an ML model. For example, a random forest model, linear regression model, Naïve Bayes model, neural network model, a vector machine model, or any other supervised learning model may be trained using such data. Any other ML model capable of being trained to predict a result based on input data may be used without departing from the scope of embodiments described herein.

In one or more embodiments, the ML model trainer also includes functionality to identify important variables. In one or more embodiments, an important variable is any data item used as an input variable model that has a significant impact on the result(s) produced by the ML model. As an example, the ML model being used may inherently produce results that indicate variable (i.e., feature) importance. As another example, the ML model may not produce a measure of feature importance, and other techniques (e.g., Fisher Score, Information Gain, etc.) may be used to derive relative feature importance. As another example, SHapeley Additive explanation (SHAP) values may be calculated for input variables. In one or more embodiments, a SHAP value represents an allocation of relative credit to input variables for impact on the result of an ML model. In one or more embodiments, the ML model training may further include refining the model by removing unimportant features from the data set. Such unimportant features may be features that have a lower impact on the accuracy of the result of the ML model. In one or more embodiments, such features are iteratively removed while assessing the impact on the accuracy of the model until a minimum number of input variables remain that still produce results above a desired accuracy threshold. In one or more embodiments, a trained ML model with a minimum number of important features is the result of the aforementioned training by the learning module (114).

In one or more embodiments of the invention, the backup storages (120) and cloud-based backup storages (140) may provide data storage services. For example, the backup storages (120) and/or cloud-based backup storages (140)

may store backups of the hosts (130). The backup storages (120) and/or cloud-based backup storages (140) may also provide copies of previously stored backups of the hosts (130). The system (100) may include any number of backup storages (backup storage A (120A), backup storage N (120N)) and/or cloud-based backup storages (cloud-based backup storage A (140A), cloud-based backup storage N (140N)) without departing from the scope of the invention.

In one or more embodiments of the invention, the backup storages (120) and cloud-based backup storages (140) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the backup storages (120) and cloud-based backup storages (140) described throughout this application.

Alternatively, in one or more embodiments of the invention, similar to the data manager module (112), the backup storages (120) and cloud-based backup storages (140) may also be implemented as logical devices.

In one or more embodiments of the invention, the hosts (130) may provide services to the clients (150). For example, the hosts (130) may host any number of applications that provide application services to the clients (150). Application services may include, but are not limited to: database services, electronic communication services, instant messaging services, file storage services, etc.

In one or more embodiments of the invention, each of the hosts (host A (130A), host N (130N)) of the hosts (130) may provide the above-discussed application services by hosting applications. Each of the hosts (130A, 130N) of the production hosts (130) may host any number of applications. Additionally, different hosts (130A, 130N) of the host (130) may host the same number of applications or different numbers of applications. Different hosts (130A, 130N) of the hosts (130) may also host similar or different applications.

In one or more embodiments of the invention, the hosts (130) may host virtual machines (VMs) (e.g., 210, FIG. 2) that host the above-discussed applications. Each of the hosts (130A, 130N) of the hosts (130) may host any number of VMs that, in turn, host any number of applications. Additional details of the VMs are described below in reference to FIG. 2.

In one or more embodiments of the invention, the hosts (130) may perform portions of a backup process (also referred to herein simply as "backup" or "backups"). For example, the hosts (130) may initiate backups under the direction of the data manager module (112). In one or more embodiments, the hosts (130) may include functionality to consolidate multiple backup generation requests so that duplicative backups (which may not be useful for restoration purposes) are not generated.

In one or more embodiments of the invention, the hosts (130) may include functionality to initiate multiple backups in parallel. For example, the hosts (130) may each host multiple backup processes. Each of the multiple backup processes may manage the initiation of a respective backup. Each of the multiple backup processes may operate concurrently to initiate multiple backups.

In one or more embodiments of the invention, the hosts (130) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the hosts (130) described throughout this application.

Alternatively, in one or more embodiments of the invention, similar to the data manager module (112), the hosts (130) may also be implemented as logical devices.

In one or more embodiments of the invention, the clients (150) may interact with the hosts (130). For example, the clients (150) may utilize application services provided by the hosts (130). When the clients (150) interact with the hosts (130), data that is relevant to the clients (150) may be stored in the hosts (130). For example, consider a scenario in which the hosts (130) host a database utilized by the clients (150). In this scenario, the database may be a client database associated with the users of the clients (150). When a new user is identified, the clients (150) may add information regarding the new user to the database. By doing so, the data that is relevant to the clients (150) may be stored in the hosts (130). This may be done because the clients (150) may desire access to the data regarding the new user at some point in time.

In one or more embodiments of the invention, the clients (150) may include functionality to use services provided by the hosts (130). For example, the clients (150) may host an application that interacts with an application database hosted by the hosts (130). When an application upgrade is available to fix critical application related issues, a production agent (e.g., 230, FIG. 2) may identify the clients (150) that require the application upgrade. The application database may then provide the application upgrade to the identified clients. By doing so, the application hosted by the identified clients may be kept up-to-date. Additional details of the production agent are described below in reference to FIG. 2.

In one or more embodiments of the invention, the clients (150) may configure the VMs of the hosts (130) before performing a backup. The clients (150) may also orchestrate the backup services provided by the data manager module (112).

In one or more embodiments of the invention, the clients (150) send instructions to the production agent (e.g., 230, FIG. 2) to configure the VMs. More specifically, the production agent (e.g., 230, FIG. 2) may configure the VMs under the direction of the clients (150). In one or more embodiments, the instructions may include, but are not limited to: instructions dictating a backup location based on certain metadata properties (e.g., time of creation, time of modification, time of access, read-only, hidden, users, groups, restore frequencies, user files, and system files), instructions for configuring a backup policy (e.g., the RPO), instructions for taking a snapshot (e.g., a point in time copy of data) of data (e.g., file system data) on the hosts (130), etc.

In one or more embodiments of the invention, the clients (150) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device, cause the computing device to perform the functionality of the clients (150) described throughout this application.

Alternatively, in one or more embodiments of the invention, similar to the data manager module (112), the clients (150) may also be implemented as logical devices.

Figure 2:
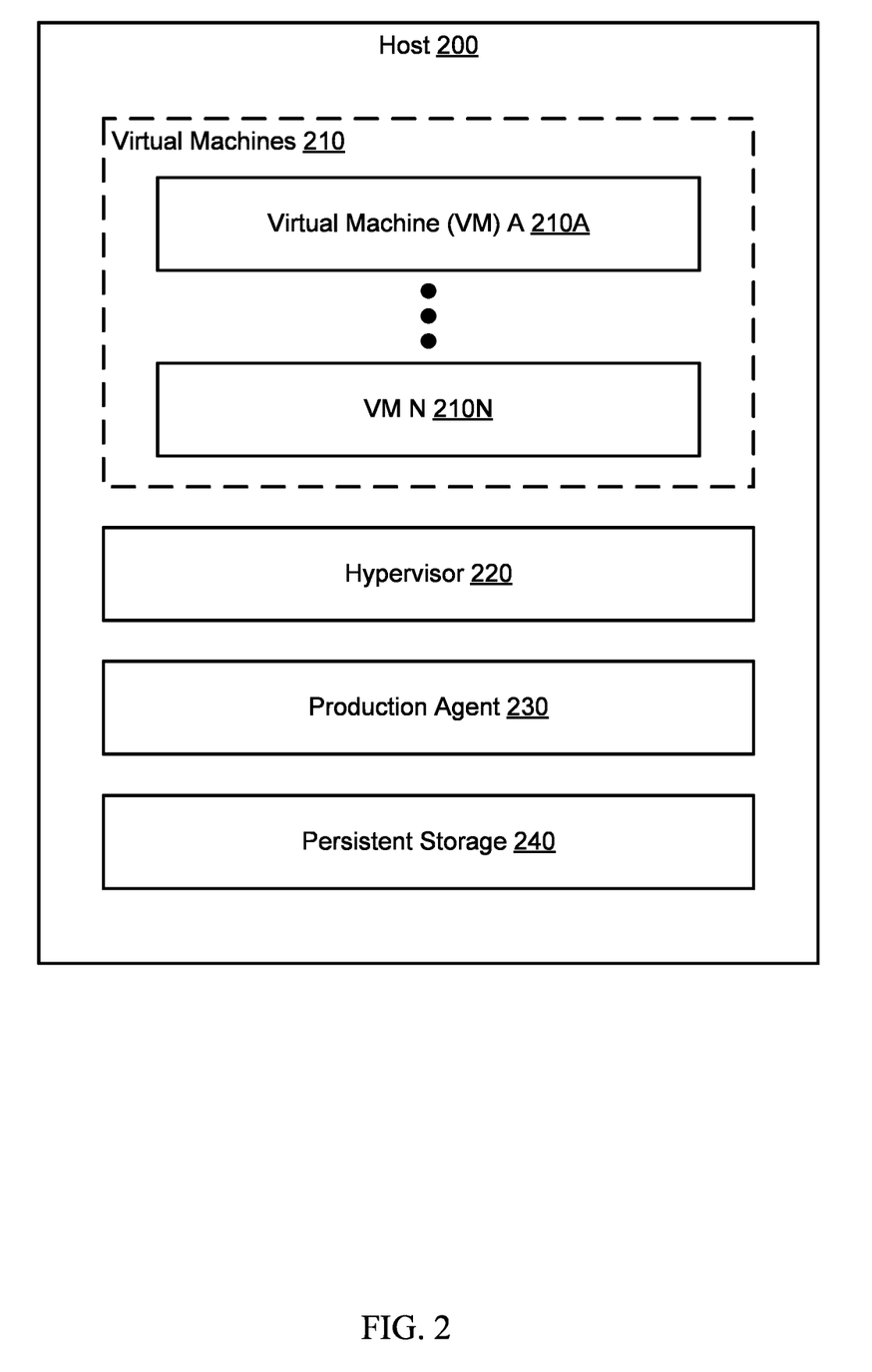
FIG. 2 shows a diagram of a host in accordance with one or more embodiments of the invention.

Turning now to FIG. 2, FIG. 2 shows a diagram of a host (200) in accordance with one or more embodiments of the invention. The host (200) may be any one of the production hosts (130) discussed above in reference to FIG. 1. The host (200) may include VMs (210), a hypervisor (220), a production agent (230), and persistent storage (240). The host (200) may include additional, fewer, and/or different components without departing from scope of the invention. Each component may be operably connected to any of the other component via any combination of wired and/or wireless connections. Each component illustrated in FIG. 2 is discussed below.

In one or more embodiments of the invention, the VMs (210) may be logical entities executed using computing resources of the host (200) or using computing resources of other computing devices (e.g., mobile phones, tablet computers, laptop computers, desktop computers, servers, distributed computing systems, cloud resources, etc.) connected to the production host. Each of the VMs (VM A (210A), VM N (210N)) may be performing similar or different processes.

In one or more embodiments, the VMs (210) (and applications hosted by the VMs) may generate data (e.g., VM data) that is stored in the persistent storage (240). In one or more embodiments, the VM data may reflect the state of a VM (210A, 210N) of VMs (210).

In one or more embodiments of the invention, the VMs (210) may provide services to the clients (e.g., 150, FIG. 1). For example, the VMs (210) may host instances of databases, email servers, or other applications that are accessible to the clients (e.g., 150, FIG. 1). The VMs (210) may host other types of applications not listed above without departing from the scope of the invention. Additionally, the applications hosted by the VMs (210) may provide application services to the clients (e.g., 150, FIG. 1).

In one or of embodiments of the invention, the VMs (210) may be implemented as computer instructions, e.g., computer code, stored in the persistent storage (240) that, when executed by a processor of the host (200), cause the host (200) to provide the functionality of the VMs (210) described throughout the application.

In one or more embodiments of the invention, the hypervisor (220) may be configured to orchestrate the operation of the VMs (210) by allocating computing resources (e.g., CPU, memory, etc.) to each of the VMs (210).

In one or more embodiments of the invention, the hypervisor (220) may be a physical device including circuitry. The physical device may be, but is not limited to: a field-programmable gate array (FPGA), an application-specific integrated circuit, a programmable processor, a microcontroller, a digital signal processor, etc. The physical device may be adapted to provide the functionality of the hypervisor (220) described throughout this application.

Alternatively, in one or more embodiments of the invention, similar to the VMs (210), the hypervisor (220) may also be implemented as computer instructions.

In one or more embodiments of the invention, the production agent (230) may be configured to locally orchestrate the performance of backup services for the VMs (210). More specifically, the production agent (230) may orchestrate the performance of the backup services under the direction of the data manager module (e.g., 112, FIG. 1). For example, the data manager module (e.g., 112, FIG. 1) sends instructions to the production agent (230) regarding: (i) when one or more backups of the VMs (210) should be generated, (ii) a set of rules dictating where the files should be sent for backup storage, and (iii) when a VM should be restored to a previous state. Other instructions not listed above may also be sent without departing from the scope of the invention.

To orchestrate the performance of the backup services, the production agent (230) may issue commands to the hypervisor (220) to control the operation of the VMs (210) when a backup of one of the VMs (210) is being generated, or when a restoration of one of the VMs (210) is being performed.

In one or more embodiments of the invention, the production agent (230) may be a hardened entity, i.e., not modifiable by an entity that is remote to the host (200) on which the production agent (230) is executing. In one or more embodiments, the production agent (230) may have a set of predefined functions that may be invoked by a remote entity. In one or more embodiments, the production agent (230) may not be configurable by modifying settings or associated configuration files by the remote entity.

Alternatively, in one or more embodiments of the invention, similar to the VMs (210), the production agent (230) may also be implemented as computer instructions. In one or more embodiments, similar to the hypervisor (220), the production agent (230) may also be a physical device including circuitry.

In one or more embodiments of the invention, the persistent storage (240) may be a physical computer readable storage medium. For example, the persistent storage (240) may be (or may include) hard disk drives, SSDs, tape drives, or other physical storage media. The persistent storage (240) may be other types of digital storage not listed above without departing from the scope of the invention. Additionally, the persistent storage (240) may be a virtualized storage without departing from the scope of the invention.

Figure 31:
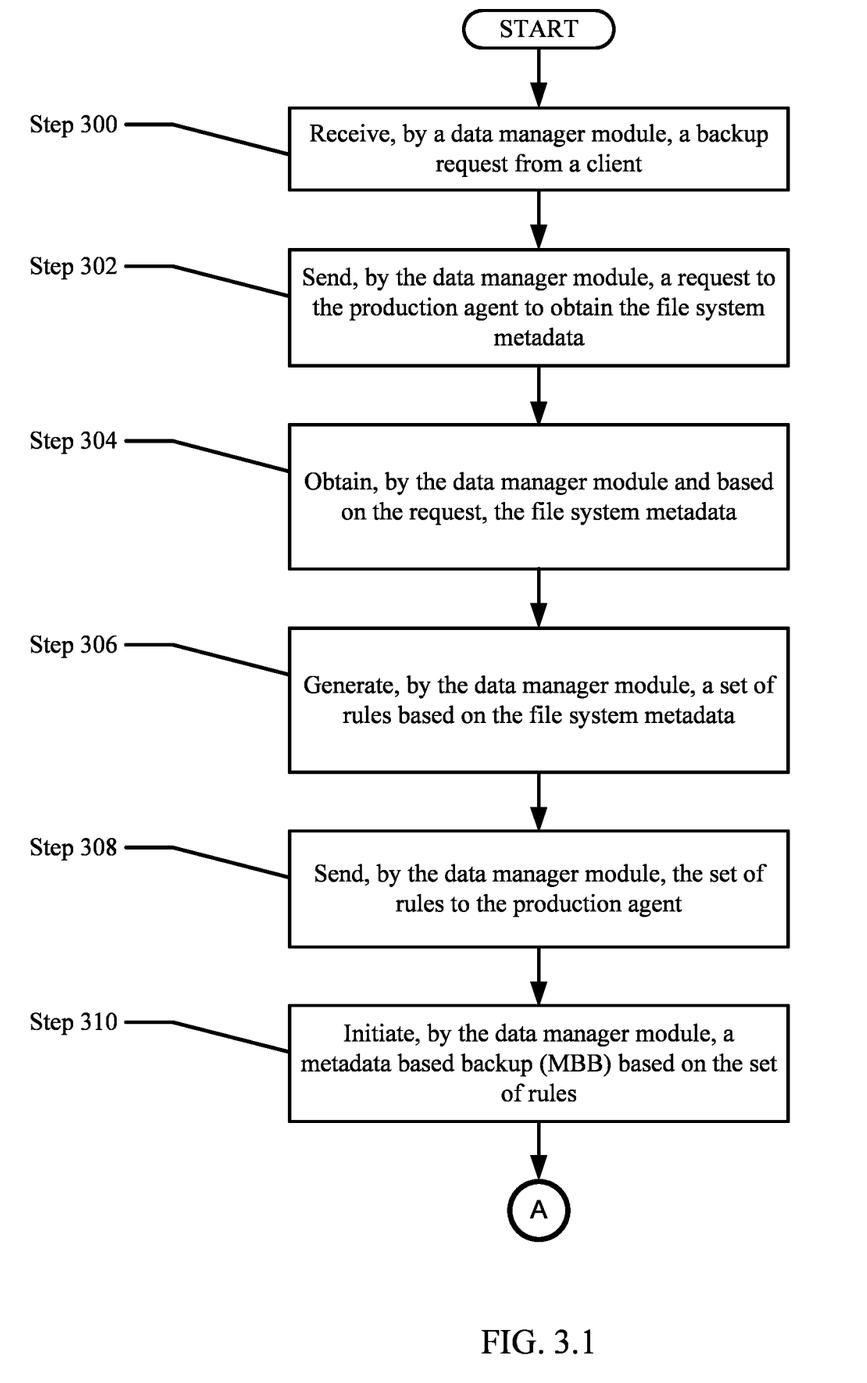
Figure 32:
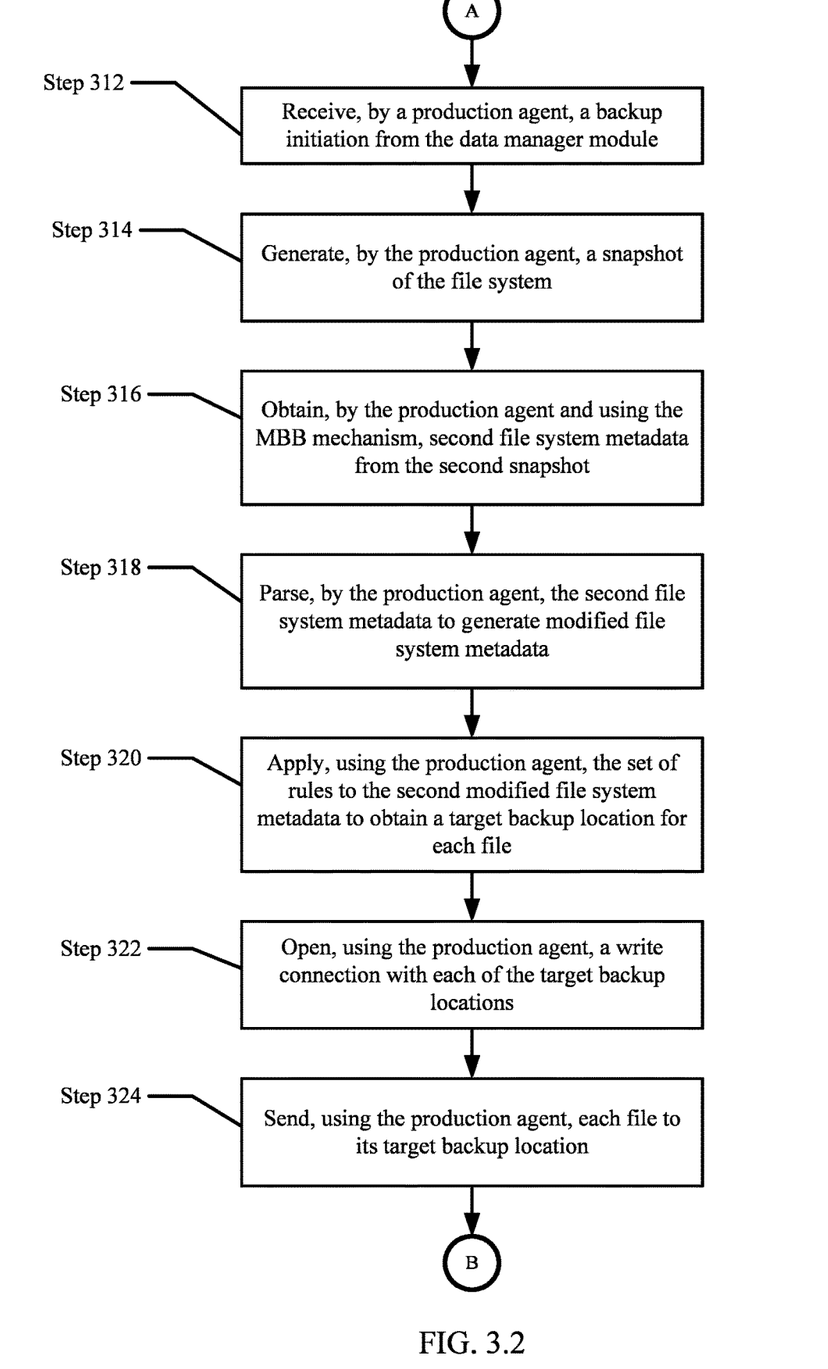
Figure 33:
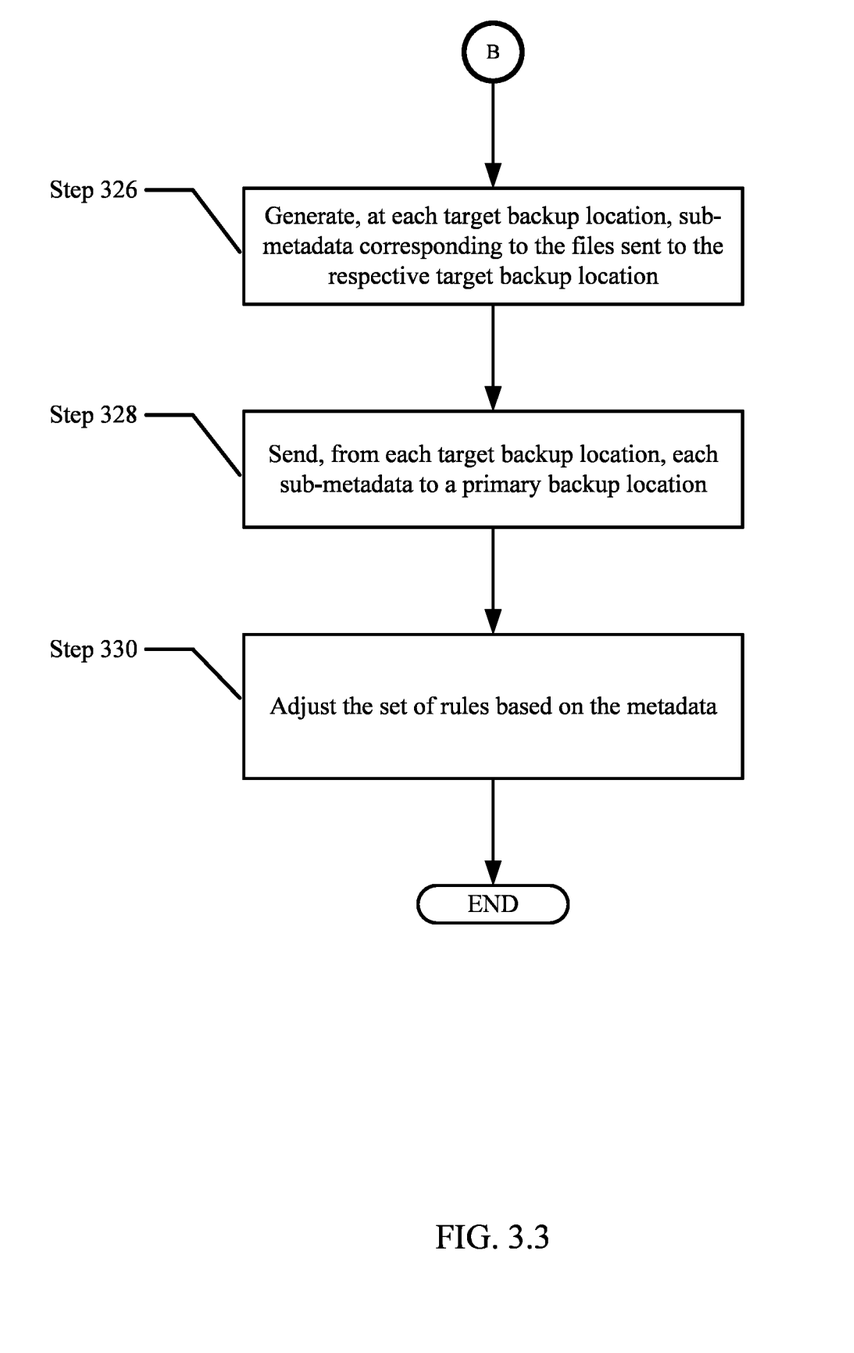

FIGS. 3.1-3.3 show a method for to provide hybrid protection policies for data protection in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be executed by, for example, the above-discussed data manager module (e.g., 112, FIG. 1). Other components of the system (100) illustrated in FIG. 1 may also execute all or part of the method shown in FIG. 3.1 without departing from the scope of the invention.

In Step 300, the data manager module receives a backup request from (e.g., a user of) a client (not shown) of the clients (e.g., 150, FIG. 1). The backup request may indicate which set of files should be backed up.

In Step 302, the data manager module sends a request to the production agent to obtain file system metadata. This file system metadata may correspond to the files that are to be backed up as part of this method, the file system metadata may correspond to files that are not to be backed up as part of this method, or a combination thereof. In response to this request, the production agent obtains file system metadata from a snapshot using a MBB mechanism. In one or more embodiments, the file includes a file called a master file table (MFT) (e.g., file system metadata). For every asset (e.g., file) of the file system, the file system metadata includes at least one component (e.g., one entry) that specifies information of an asset. The information may be, for example (but not limited to): an identifier of an asset, an identifier of a parent folder containing an asset, a size of an asset, an offset for data of an asset in a volume, one or more attributes of an asset, time of creation, time of modification, time of access, groups, restore frequencies, user files, system files, deduplication ratio, file type, an access control list (ACL) of an asset, etc. Additional detail about the aforementioned file system metadata is provided below.

In one or more embodiments of the invention, the identifier of the asset may be a name (e.g., file_1, folder_1, etc.) of the asset. In one or more embodiments, a parent folder may be a folder that is one level higher than a current directory of an asset in a file system hierarchy. In this manner, the identifier of the parent folder may specify the assets included in the parent folder. For example, the identifier of the parent folder may be folder_3/file_2, which specifies that folder_3 contains file_2.

In one or more embodiments of the invention, the size (e.g., 50 MB, 50 Gigabytes (50 GB), etc.) of the asset may specify how much storage of the volume is consumed by the asset. In one or more embodiments, the offset for the data of the asset may be a pointer that points to one or more divisions of the volume that store the data. For example, if the offset points to divisions 11 and 18 as the locations at which the data is stored, the MBB mechanism should access divisions 11 and 18 to execute a full backup from the volume.

In one or more embodiments of the invention, the attribute(s) of the asset may specify one or more characteristics of the asset. The attribute(s) of the asset may also specify how the file system should manage the asset. The attribute(s) of the asset may specify, for example, that: the asset is read-only, the asset is hidden, etc. In one or more embodiments, the ACL of the asset may be a list of permissions that defines which user has access to the asset. For example, the ACL of the asset may specify that a user with a user access level of 7 or above can access the asset. Additional details of the user access level are described below in reference to FIG. 4.5.

In one or more embodiments of the invention, the MBB mechanism has access to the file system metadata. For this reason: (i) the MBB mechanism may be used by the data manager module to execute a full MBB of the file system to the backup storage and (ii) the MBB mechanism does not need to crawl the entire file system to execute backup of the file system. Because the MBB mechanism does not crawl the entire file system, the MBB mechanism does not add an additional workload on the production workloads.

In one or more embodiments of the invention, to execute the full MBB, the MBB mechanism may need to read/process each asset of the file system. The MBB mechanism may also allow the user to select assets to backup or automatically backs up certain assets. Thereafter, upon completion of the MBB, the user may easily search for the assets in the backup storage and restore.

In Step 304, the data manager module obtains the file system metadata. After the MBB has generated the file system metadata and provided the file system metadata to the production host, the production host then sends the file system metadata to the data manager module.

In Step 306, the data manager module generates a set of rules that dictate a target backup location based on one or more metadata components. For example, some of the rules may initially be set by a user. Further, in one or more embodiments, the rules may be partially or fully set by a data manager module (discussed in detail below). The data manager module may receive the rules, and modify the rules based on the file system metadata.

The rules set may dictate one or more target backup locations. For example, the rules may dictate that assets having certain metadata information or combinations of metadata information should be sent to a first target backup location while assets having other metadata information or combinations of metadata information should be sent to a second target backup location. It should be appreciated that any number of rules may be utilized and each rules may utilize any number of metadata information or combinations of information. Further, in one or more embodiments, the target backup locations may include the backup storages (e.g., 120, FIG. 1) and/or cloud-based backup storages (e.g., 140, FIG. 1). For example, the rules may dictate that assets having certain metadata information should be sent to the backup storages while assets having other metadata information should be sent to the cloud-based storages. In addition, in one or more embodiments, the rules may dictate that assets having certain metadata information should be sent to both backup storages and cloud-based storages. Further, in one or more embodiments, one of the target backup locations may be designated as a primary backup location (e.g., by a user or the data manager module).

In Step 308, the data manager module sends the set of rules to the production agent.

In Step 310, the data manager module initiates a MBB of the set of files and based on the set of rules generated by the data manager module.

Turning now to FIG. 3.2, the method shown in FIG. 3.2 may be executed by, for example, the above-discussed production agent. Other components of the system (100) illustrated in FIG. 1 may also execute all or part of the method shown in FIG. 3.2 without departing from the scope of the invention.

In Step 312, the production agent receives a backup initiation request from the data manager module. The backup request may indicate which set of files should be backed up, which may include all or a portion of the files managed by the production agent.

In Step 314, the production agent generates a snapshot of the file system. Based on receiving the backup initiation request from the data protection module, the production agent generates the snapshot. In one or more embodiments, to generate the snapshot, the production agent may use a volume shadow copy service (VSS). The production agent may include functionality to implement the VSS.

In Step 316, similar to Step 302 of FIG. 3.1, the production agent obtains second file system metadata from the snapshot using the MBB mechanism. The second file system metadata includes metadata information for one or more assets.

In Step 318, the production agent parses the file system metadata to generate modified file system metadata. In one or more embodiments, while generating the modified file system metadata, the production agent only transforms the offset component of the file system metadata. By doing so, while the other components of the modified file system metadata include the same information as the file system metadata, the offset component of the modified file system metadata points to one or more blocks of the file system that stores the data. For example, if the offset points to blocks 3 and 6 as the locations at which the data is stored, a recovery agent should access blocks 3 and 6 to restore the data.

In Step 320, the production agent applies the rules sent by the data manager module to the modified file system metadata produced in Step 318. As discussed above in reference to Step 306, the rules may dictate target backup locations for files based on the metadata corresponding to each file. The production agent then determines the target backup location for each file by applying the rules to the modified file system metadata. Then, In Step 322, the production agent opens a write connection with each of the target backup locations. In Step 320, the production agent determines each of the backup locations to which the files will be sent, and thus is able to open write connections with only those backup locations and may avoid opening write connections with backup locations that will not be used.

In Step 324, the production agent sends each file to its corresponding target backup location. Each connection between the production agent and a target backup location includes a separate queue or pool. Thus, sending a file to a target backup location includes sending the file to the queue or pool associated with that target backup location. The file may then sit in the queue until the file is written to the corresponding target backup location. When there are multiple target backup locations, the production agent may send files to separate queues, and files may be written to separate target backup locations concurrently. By doing so, the time to complete a backup operation may be significantly reduced.

Turning now to FIG. 3.3, the method shown in FIG. 3.3 may be executed by, for example, the above-discussed data manager module, the production agent, and the learning module (e.g., 114, FIG. 1). Other components of the system (100) illustrated in FIG. 1 may also execute all or part of the method shown in FIG. 3.3 without departing from the scope of the invention.

In Step 326, similar to Step 302 of FIG. 3.1, sub-metadata is generated at each of the target backup locations corresponding to the files sent to the corresponding one of the target backup locations. Each of the sub-metadata includes information of the files sent to the corresponding one of the target backup locations.

In Step 328, each of the sub-metadata generated in Step 326 are sent to a primary backup location. The sub-metadata is then combined to generate overall backup metadata such that all of the metadata corresponding to the backed up files is located in one location, which may make other operations that use backup data more efficient, such as restoration operations.

In Step 330, the set of rules generated in Step 306 may be updated based on metadata generated during this method. For example, the metadata may include the file system metadata received by the data manager module in Step 304, the second file system metadata generated in Step 316, the modified file system metadata in Step 318, and/or the overall backup metadata generated in Step 328. Further, the adjusting of the rules may be performed by the data manager module and/or the learning module.

For example, the learning module may provide an ML model, as described above, that is trained using one or more of the aforementioned metadata, including any combination of the information contained within the metadata. Further, the ML model may also be trained using: data from multiple users, hosts, or groups; comparisons between different metadata, volumes of data produced, data indicative of deduplication including generation of deduplication; sets of rules established by different users; etc. In one or more embodiments, any ML model suitable for predicting a result based on input variables may be used. In one or more embodiments, results, which include the set of rules, are used to validate the ML model to determine how well the ML model predicts the results.

Further, the adjusted set of rules may be provided to the data manager module, and used in place of the set of rules sent in Step 308. In this manner, adjusting the set of rules may be seen as a feedback loop whereby the set of rules sent to the production agent is adjusted after performing a backup operation, either each time or at intervals. As such, the set of rules may be adjusted any number of times. Further, upon adjusting the set of rules, a notification may be sent to a user that indicates that one or more of the rules in the set of rules has been adjusted.

In one or more embodiments of the invention, the method may end following Step 330.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for information recovery, the method comprising:
 providing a set of rules to a plurality of hosts, wherein each host performs a backup operation using the set of rules by sending at least one file to a first backup location, wherein the set of rules specifies backup locations for each file;
 receiving, from each host, metadata corresponding to files backed up in the backup operation,
  wherein the metadata from each host forms a set of metadata,
  wherein each of the metadata specifies information of a corresponding one of the files, and
  wherein the metadata is received at a location that is separate from both the backup locations and each host;
 providing the set of metadata to a learning module to train a model using at least the information of the corresponding one of the files;
 receiving, in response to the providing, metadata analysis from the learning module, wherein the metadata analysis is an output of the model;
 adjusting, using the metadata analysis, the set of rules to obtain an adjusted set of rules, wherein the adjusted set of rules dictates that the at least one file should be sent to a second backup location that is different from the first backup location based on metadata associated with the at least one file; and
 providing the adjusted set of rules to the plurality of hosts, wherein at least one host of the plurality of hosts uses the adjusted set of rules to identify the second backup location for the at least one file.

2. The method of claim 1, further comprising providing a notification to a user that the set of rules has been adjusted.

3. The method of claim 1, wherein the at least one backup location comprises at least a storage array and a cloud-based storage array.

4. The method of claim 1, further comprising:
 providing the adjusted set of rules to the plurality of hosts, wherein each host performs a second backup operation using the adjusted set of rules;
 receiving, from each host, a second metadata corresponding to files backed up in the second backup operation, wherein the second metadata from each host forms a second set of metadata; and
 providing the second set of metadata to the learning module; and
 adjusting, using the learning module and the second set of metadata, the adjusted set of rules to obtain a second adjusted set of rules.

5. The method of claim 1, wherein the learning module generates the metadata analysis based at least in part on one selected from a group comprising data selected from the group consisting of an identifier of an asset, an identifier of a parent folder containing an asset, a size of an asset, an offset for data of an asset in a volume, one or more attributes of an asset, time of creation, time of modification, time of access, groups, restore frequencies, user files, system files, deduplication ratio, file type, and an ACL of an asset.

6. The method of claim 1, wherein the set of rules is user-defined.

7. The method of claim 1, wherein the set of rules comprises a plurality of set of rules, wherein providing the set of rules to a plurality of hosts comprises providing one of the plurality of set of rules to each of the plurality of hosts, and wherein each host performs the backup operation using the corresponding one of the set of rules.

8. A non-transitory computer readable medium comprising computer readable program code, which when executed by a computer processor enables the computer processor to perform a method for information storage, the method comprising:
 providing a set of rules to a plurality of hosts, wherein each host performs a backup operation using the set of rules by sending at least one file to a first backup location, wherein the set of rules specifies backup locations for each file;
 receiving, from each host, metadata corresponding to files backed up in the backup operation,
  wherein the metadata from each host forms a set of metadata,
  wherein each of the metadata specifies information of a corresponding one of the files, and
  wherein the metadata is received at a location that is separate from both the backup locations and each host;
 providing the set of metadata to a learning module to train a model using at least the information of the corresponding one of the files;
 receiving, in response to the providing, metadata analysis from the learning module, wherein the metadata analysis is an output of the model;
 adjusting, using the learning module, the set of rules to obtain an adjusted set of rules, wherein the adjusted set of rules dictates that the at least one file should be sent to a second backup location that is different from the first backup location based on metadata associated with the at least one file; and
 providing the adjusted set of rules to the plurality of hosts, wherein at least one host of the plurality of hosts uses the adjusted set of rules to identify the second backup location for the at least one file.

9. The non-transitory computer readable medium of claim 8, wherein the method further comprises providing a notification to a user that the set of rules has been adjusted.

10. The non-transitory computer readable medium of claim 8, wherein the at least one backup location comprises at least a storage array and a cloud-based storage array.

11. The non-transitory computer readable medium of claim 8, wherein the method further comprises:
 providing the adjusted set of rules to the plurality of hosts, wherein each host performs a second backup operation using the adjusted set of rules;
 receiving, from each host, a second metadata corresponding to files backed up in the second backup operation, wherein the second metadata from each host forms a second set of metadata; and
 providing the second set of metadata to the learning module; and
 adjusting, using the learning module, the adjusted set of rules to obtain a second adjusted set of rules.

12. The non-transitory computer readable medium of claim 8, wherein the learning module adjusts the set of rules based at least in part on a deduplication ratio.

13. The non-transitory computer readable medium of claim 8, wherein the set of rules is user-defined.

14. The non-transitory computer readable medium of claim 8, wherein the set of rules comprises a plurality of set of rules, wherein providing the set of rules to a plurality of hosts comprises providing one of the set of rules to each of the plurality of hosts, and wherein each host performs the backup operation using the corresponding one of the set of rules.

15. The non-transitory computer readable medium of claim 8, wherein the learning module generates the metadata analysis based at least in part on one selected from a group comprising data selected from the group consisting of an identifier of an asset, an identifier of a parent folder containing an asset, a size of an asset, an offset for data of an asset in a volume, one or more attributes of an asset, time of creation, time of modification, time of access, groups, restore frequencies, user files, system files, deduplication ratio, file type, and an ACL of an asset.

16. A file system comprising:
a data manager system comprising:
a first computer processor; and
a data manager module executing on the first computer processor and configured to perform a method for information storage, the method comprising:
providing a set of rules to a host device, wherein the host device performs a first backup operation using the set of rules by sending at least one file to a first backup location, wherein the set of rules specifies backup locations for each file;
receiving, from the host device, a first metadata corresponding to files backed up in the backup operation, wherein each of the first metadata specifies information of a corresponding one of the files, and wherein the first metadata is received at a location that is separate from both the backup locations and the host device;
providing the first metadata to a learning module to train a model using at least the information of the corresponding one of the files;
receiving, from the learning module, metadata analysis, wherein the metadata analysis is an output of the model;
adjusting, using the metadata analysis, the set of rules to obtain an adjusted set of rules, wherein the adjusted set of rules dictates that the at least one file should be sent to a second backup location that is different from the first backup location based on metadata associated with the at least one file; and
providing the adjusted set of rules to the host device, wherein the host device performs a second backup operation using the adjusted set of rules by sending the at least one file to the second backup location.

17. The file system of claim 16, wherein the at least one backup location comprises at least a storage array and a cloud-based storage array.

* * * * *